United States Patent
Keen et al.

(10) Patent No.: US 12,236,539 B2
(45) Date of Patent: Feb. 25, 2025

(54) CONTEXTUAL POSITIONING IN VIRTUAL SPACE

(71) Applicant: International Business Machines Corporation, Armonk, NY (US)

(72) Inventors: Martin G. Keen, Cary, NC (US); Jeremy R. Fox, Georgetown, TX (US); Alexander Reznicek, Troy, NY (US); Bahman Hekmatshoartabari, White Plains, NY (US)

(73) Assignee: International Business Machines Corporation, Armonk, NY (US)

(*) Notice: Subject to any disclaimer, the term of this patent is extended or adjusted under 35 U.S.C. 154(b) by 207 days.

(21) Appl. No.: 17/807,784

(22) Filed: Jun. 20, 2022

(65) Prior Publication Data
US 2023/0410435 A1 Dec. 21, 2023

(51) Int. Cl.
*G06T 19/00* (2011.01)
*G06F 3/01* (2006.01)
*G10L 15/22* (2006.01)

(52) U.S. Cl.
CPC ............ *G06T 19/006* (2013.01); *G06F 3/011* (2013.01); *G10L 15/22* (2013.01); *G10L 2015/223* (2013.01)

(58) Field of Classification Search
None
See application file for complete search history.

(56) References Cited

U.S. PATENT DOCUMENTS

| | | |
|---|---|---|
| 6,772,195 B1 | 8/2004 | Hatlelid et al. |
| 7,775,885 B2 | 8/2010 | Van Luchene |
| 8,140,340 B2 | 3/2012 | Bhogal |
| 8,156,184 B2 | 4/2012 | Kurata |

(Continued)

FOREIGN PATENT DOCUMENTS

| | | |
|---|---|---|
| WO | 2010057304 A1 | 5/2010 |
| WO | 2012088285 A2 | 6/2012 |

(Continued)

OTHER PUBLICATIONS

Everett et al., "A Natural Language Interface for Virtual Reality Systems," https://citeseerx.ist.psu.edu/viewdoc/download?doi=10.1.1.52.4330&rep=rep1&type=pdf, accessed May 27, 2022, 3 pgs.

(Continued)

*Primary Examiner* — Martin Mushambo
(74) *Attorney, Agent, or Firm* — Kelsey M. Skodje

(57) ABSTRACT

Methods, systems, and a computer program product are disclosed. The first method includes obtaining virtual session data in real time, identifying a positional utterance in the virtual session data, and generating a positional insight for the positional utterance. The first method also includes generating a best-practices recommendation based on the positional insight. The second method includes obtaining virtual session data, identifying positional utterances in the virtual session data, and generating positional insights for each of the positional utterances. The second method also includes selecting each of the positional insights having confidence scores above a threshold score and generating best-practices recommendations based on the selected positional insights.

25 Claims, 6 Drawing Sheets

(56) References Cited

U.S. PATENT DOCUMENTS

| | | | |
|---|---|---|---|
| 10,986,230 B1* | 4/2021 | Sethi | H04L 51/216 |
| 2008/0229215 A1 | 9/2008 | Baron et al. | |
| 2009/0063995 A1* | 3/2009 | Baron | H04N 7/17318 |
| | | | 715/753 |
| 2009/0113314 A1 | 4/2009 | Dawson et al. | |
| 2009/0210804 A1* | 8/2009 | Kurata | G06Q 10/10 |
| | | | 715/757 |
| 2009/0288002 A1* | 11/2009 | Hamilton, II | G06F 3/0481 |
| | | | 715/706 |
| 2009/0299988 A1 | 12/2009 | Hamilton, II et al. | |
| 2010/0083138 A1 | 4/2010 | Dawson et al. | |
| 2012/0131478 A1 | 5/2012 | Maor et al. | |
| 2012/0162214 A1* | 6/2012 | Chavez | G06F 3/04815 |
| | | | 345/419 |
| 2012/0270620 A1 | 10/2012 | Bhogal et al. | |
| 2016/0350973 A1* | 12/2016 | Shapira | G06F 3/011 |
| 2017/0103564 A1* | 4/2017 | Hayashida | A63F 13/56 |
| 2018/0165862 A1* | 6/2018 | Sawaki | G06T 13/40 |
| 2018/0165863 A1* | 6/2018 | Kubo | A63F 13/25 |
| 2019/0098255 A1* | 3/2019 | Bergmann | G06Q 10/1093 |
| 2019/0306483 A1* | 10/2019 | Ishikawa | H04N 13/128 |
| 2019/0355281 A1 | 11/2019 | Abe | |
| 2020/0118336 A1* | 4/2020 | Oyanagi | G06F 3/011 |
| 2020/0128902 A1 | 4/2020 | Brown | |
| 2021/0165825 A1 | 6/2021 | Tanaka | |
| 2021/0256769 A1 | 8/2021 | St Clair | |
| 2023/0186542 A1* | 6/2023 | Gotoh | G06F 3/165 |
| | | | 345/419 |
| 2023/0224667 A1 | 7/2023 | Rodman | |

FOREIGN PATENT DOCUMENTS

| | | | |
|---|---|---|---|
| WO | 2016191051 A1 | 12/2016 | |
| WO | 2023247306 A1 | 12/2023 | |

OTHER PUBLICATIONS

IBM, "IBM Unveils z15 With Industry-First Data Privacy Capabilities," https://newsroom.ibm.com/2019-09-12-IBM-Unveils-z15-With-Industry-First-Data-Privacy-Capabilities, Sep. 12, 2019, 8 pgs.

Keen et al., "Contextual Positioning in Virtual Space," U.S. Appl. No. 17/807,793, filed Jun. 20, 2022.

Kuijk, F. "A Method for Autonomous Positioning Avatars in a Group," 2017 International Conference on Cyberworlds (CW), pp. 178-181. IEEE, 2017.

List of IBM Patents or Patent Applications Treated as Related, Jun. 17, 2022, 2 pgs.

Mehdi et al., "An Interactive Speech Interface for Virutal Characters in Dynamic Environments," https://citeseerx.ist.psu.edu/viewdoc/download?doi=10.1.1.549.2736&rep=rep1&type=pdf.

Mell et al., "The NIST Definition of Cloud Computing," Recommendations of the National Institute of Standards and Technology, U.S. Department of Commerce, Special Publication 800-145, Sep. 2011, 7 pgs.

Unknown, "Metaverse," https://golden.com/wiki/Metaverse-PB9GNW, printed Jun. 20, 2022, 6 pgs.

Wikipedia, "Metaverse," https://en.wikipedia.org/wiki/Metaverse, printed Jun. 20, 2022, 10 pgs.

Wikipedia, "Teleportation," https://en.wikipedia.org/wiki/Teleportation, printed May 27, 2022, 4 pgs.

International Search Report and Written Opinion, date of mailing Sep. 14, 2023, Application No. EP2023/066068, 19 pages.

Anonymous, "Voice Avatars: The Sound of a New You", VoiceMod, downloaded from the Wayback Machine Internet Archive from Apr. 9, 2022, 3 pages, <https://web.archive.org/web/20220409125245/https://www.voicemod.net/voice-avatars/>.

* cited by examiner

CONTEXTUAL POSITIONING IN VIRTUAL SPACE

BACKGROUND

The present disclosure relates to avatar positioning in virtual spaces and, more specifically, to generating positional recommendations based on natural language utterances interpreted in real time.

Virtual spaces (e.g., the metaverse/virtual reality environments) can provide a variety of experiential scenarios used in education, training, entertainment, etc. For example, a firefighter may undergo a training scenario that includes sights and sounds of a fire emergency rendered in a virtual world. In a virtual space, a user may control movements of an avatar (e.g., a three dimensional graphical representation of the user) in order to interact with the environment. For example, the virtual avatar can be controlled based on the user's body movements captured by a tracking system. The user can also interact with the virtual environment and other users therein by, for example, speaking into a microphone, listening to recorded audio, etc.

Communicating in this way can allow users to provide directions for spatial positioning using natural language utterances. For example, an instructor can verbally direct users to look in a specific direction or stand near an object of interest within the virtual environment. However, current VR systems can lack effective ways of mapping natural language utterances to corresponding positional directives. This can reduce the realism of the VR experience and limit the efficiency of virtual training scenarios.

SUMMARY

Various embodiments are directed to a method, which includes obtaining virtual session data in real time. The virtual session data can be added to a corpus of historical virtual session data. The method also includes identifying a positional utterance in the virtual session data. These operations may advantageously provide techniques for mapping natural language utterances to positional information in three dimensional virtual space. The positional utterance can be identified in real time by natural language understanding. Additionally, the method includes generating a positional insight for the positional utterance. The positional insight can be generated based on a contextual correlation between the positional utterance and contextual information. The method also includes generating a best-practices recommendation based on the positional insight. This may allow improved quality and understanding of virtual instructional sessions. The best-practices recommendation can be a recommendation for positioning user avatars or virtually rendered objects in a virtual instruction session. A report providing the best-practices recommendation for an instructional session can be generated as well. In some embodiments, the method includes receiving user feedback in response to the best-practices recommendations. This may improve models for mapping natural language utterances to positional information.

Further embodiments are directed to a system, which includes a memory and a processor communicatively coupled to the memory, wherein the processor is configured to perform the method. Additional embodiments are directed to a computer program product, which includes a computer readable storage medium having program instructions embodied therewith, the program instructions executable by a processor to cause a device to perform the method.

Additional embodiments are directed to a method that includes obtaining virtual session data, identifying positional utterances in the virtual session data, and generating positional insights for each of the positional utterances. These operations may improve virtual sessions by mapping natural language utterances to positional information in three dimensional virtual space. The method also includes selecting each of the positional insights having confidence scores above a threshold score and generating best-practices recommendations based on the selected positional insights. The best-practices recommendations can include recommended positions of at least one user avatar in a virtual space. This may allow improved user experiences in virtual reality environments. Further embodiments are directed to a system, which includes a memory and a processor communicatively coupled to the memory, wherein the processor is configured to perform the method.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

DETAILED DESCRIPTION

Figure 1:
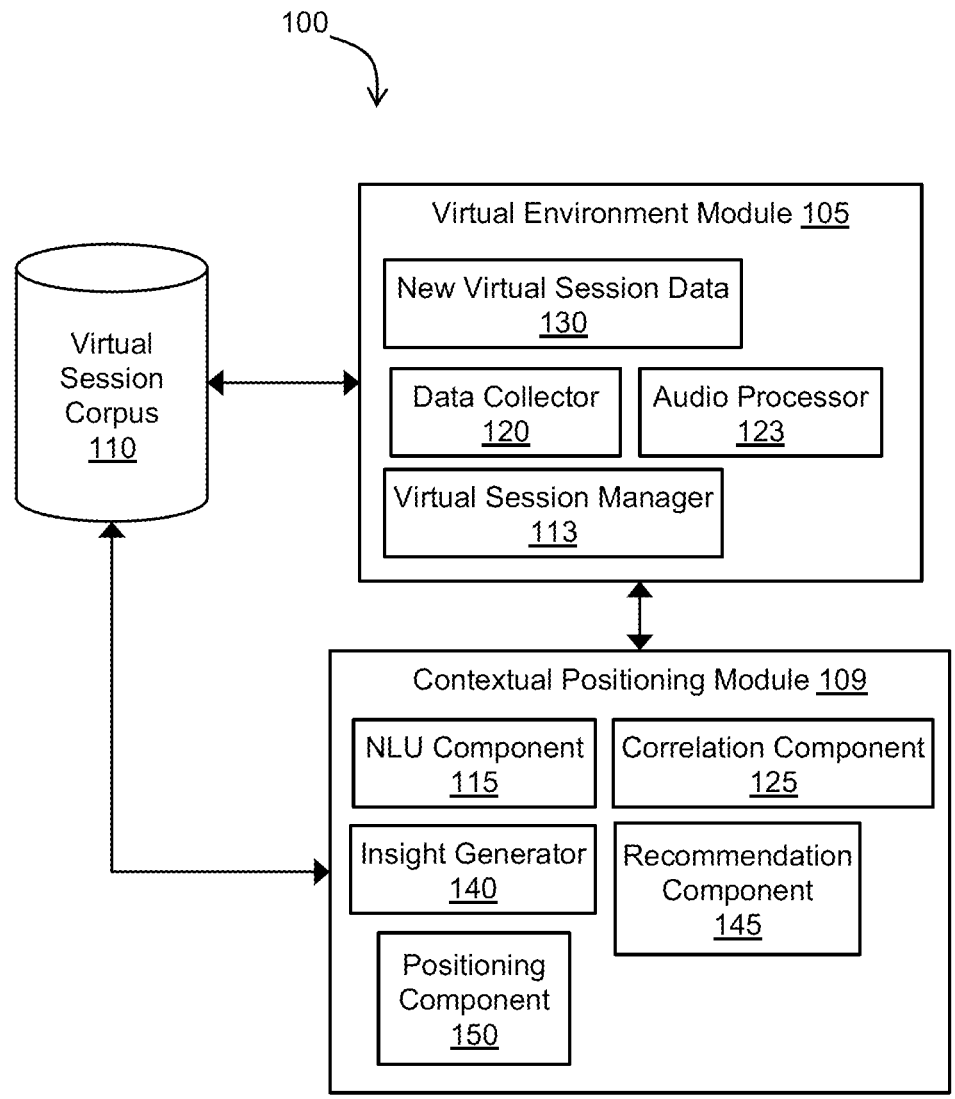
FIG. 1 is a block diagram illustrating a computing environment for contextual positioning in a virtual space, according to some embodiments of the present disclosure.

Aspects of the present disclosure relate generally to avatar positioning in virtual spaces and, more specifically, to generating positional recommendations based on natural language utterances interpreted in real time. While the present disclosure is not necessarily limited to such applications, various aspects of the disclosure may be appreciated through a discussion of various examples using this context.

Metaverse is a portmanteau of "meta" (meaning beyond) and "universe," typically used to describe virtual spaces within digital environments such as online games, social media, and virtual reality (VR). Although there is no universally accepted definition of the "metaverse," many see it as an iteration of the internet that will provide virtual spaces in which users can interact in persistent, shared, three dimensional (3D) virtual spaces linked into a perceived virtual universe. Virtual spaces such as these can provide a variety of experiential scenarios used in education, training, entertainment, etc. In a virtual space, a user may control movements of an avatar (e.g., a three dimensional graphical representation of the user) in order to interact with the environment. For example, the virtual avatar can be controlled based on the user's body movements captured by a tracking system. The user can also interact with the virtual environment and other users therein by, for example, speaking into a microphone, listening to recorded audio, etc.

Virtual instructional sessions can be carried out in virtual environments (e.g., metaverse and VR). An advantage of metaverse/VR instructional sessions is that, unlike other virtual learning platforms, training can take place in a 3D positional space. For example, hardware education for datacenter field specialists can be adapted to allow participants to interact with hardware in a virtual datacenter. Rather than requiring on-site access to hardware, this can allow participants to practice procedures on a system, such as replacing a failed disk drive, in virtual reality, while the physical equipment is controlled by the system.

In 3D positional spaces, users can provide instructions or requests for an avatar's position to be rendered in a specific position. These positions can be indicated using verbal utterances, such as natural language utterances directing users to a move into a given position/location (e.g., in front of a particular server rack, to the left of a virtual chalkboard, under a virtual table, etc.), to look in a specific direction, or to orient themselves in a particular way with respect to an object of interest within the virtual environment. However, current VR systems can lack effective ways of mapping natural language utterances to corresponding positional directives. This can reduce the realism of the virtual environment rendering and limit the efficiency of virtual training scenarios.

To address these and other challenges, embodiments of the present disclosure include techniques for using natural language understanding (NLU) to interpret an utterance and direct an avatar to the correct positional space in a virtual environment. In some embodiments, an instructor's utterances can be captured by an NLU-enabled microphone during a virtual instructional session, and the position of one or more user avatars (e.g. representing students) can be adjusted in real time to match the positional intent of the instructor, as determined by NLU processing, nearest neighbor clustering, and vector calculation tailored to the derived personalized intent of both the instructor and the instructional session context.

It is to be understood that the aforementioned advantages are example advantages and should not be construed as limiting. Embodiments of the present disclosure can contain all, some, or none of the aforementioned advantages while remaining within the spirit and scope of the present disclosure.

Turning now to the figures, FIG. 1 is a block diagram illustrating a computing environment 100 for contextual positioning in a virtual space, according to some embodiments of the present disclosure. Environment 100 includes a virtual environment module 105, a contextual positioning module 109, and a virtual session corpus 110.

Corpus 110 includes data from instructional sessions (e.g., training exercises, demonstrations, lectures, etc.) carried out in a virtual space managed by virtual session manager 113. The virtual session data can be gathered from historical and current virtual instructional sessions by data collector 120. Examples of virtual instructional sessions and data collection techniques are discussed in greater detail below with respect to FIGS. 2 and 3. The information from each virtual instructional session stored in corpus 110 can include timestamps, elapsed times (e.g., of the session and/or intervals therein), reported student and instructor positional information at each elapsed time interval, user (e.g., student and instructor) avatar identifiers (IDs), rendered object IDs, textual information rendered in the virtual space, user microphone audio data (e.g., recorded by audio processor 123), and any other ancillary information for understanding the virtual session.

Information from natural language utterances recorded in virtual sessions can also be stored in corpus 110. In some embodiments, the utterances are extracted from microphone audio data. For example, audio processor 123 can use automatic speech recognition (ASR) to transcribe audio data from users' microphones. Utterance information (e.g., intent, positional requests and/or instructions, contextual information, etc.) can be extracted by natural language understanding (NLU) component 115 using various NLU techniques. Named entity recognition (NER) may be used to identify nouns, verbs, adjectives, etc. in the ASR transcriptions. Part-of-speech (POS) tagging may be used to further understand the functions of the entities identified in the ASR transcriptions. Additionally, entity resolution techniques may be used to cross-reference the entities with a knowledge graph of common terms used in virtual instructional sessions.

Correlation component 125 can derive correlations between positional requests and contextual information from the virtual session data in corpus 110. This is discussed in greater detail with respect to FIGS. 2 and 3 (e.g., at operations 220 and 320, respectively). New virtual session data 130 can be collected in real time from an in-progress virtual session. The new virtual session data 130 can be added to corpus 110. Examples of new virtual data 130 that may be collected can include data substantially similar to the historical virtual session data in corpus 110 (see above).

NLU component 115 can extract utterance information from the new virtual session data 130 using NLU techniques discussed above. In some embodiments, NLU component 115 identifies utterances that contain positional information from the new virtual session data 130. These positional information utterances can be utterances predicted (e.g., with a likelihood greater than a threshold likelihood) to be related to user avatar position, such as positional statements, instructions, requests, etc. Insight generator 140 can generate positional insights and corresponding confidence scores by deriving contextual correlations for the identified positional information using techniques such as those used by correlation component 125.

Recommendation component 145 generates position recommendations and/or best-practices recommendations based on the positional insights and corresponding confidence scores. This is discussed in greater detail below with respect to operations 250 and 350 (illustrated in FIGS. 2 and 3, respectively). Based on a position recommendation, positioning component 150 can use one or more positional rendering techniques (e.g., at operation 270 illustrated in FIG. 2) to make appropriate modifications to the position rendering, such as teleporting, smoothing, interpolating, etc. For example, teleporting can include changing the position of the student avatar from one location to another without rendering intermediate locations/movements (e.g., upon finishing a written exam at a desk in a classroom space, the student can be "teleported" to a demonstration space for carrying out training exercises). Smoothing can include smoothly moving the student avatar from the current position to the ideal position over a defined period of time (e.g., from standing to crouching, turning around to face another direction, walking from one location to another, etc.). Interpolating can include using a series of intermediate positions to move the student avatar from the current position to the ideal position over a defined period of time.

Based on a best-practices recommendation, evaluation component 155 can generate a report that includes instructional session recommendations and output the report to at least one user, such as an instructor or student(s) participating in the virtual session. These recommendations can use positional insights to suggest ways for an instructor to improve educational outcomes for students.

Figure 2:
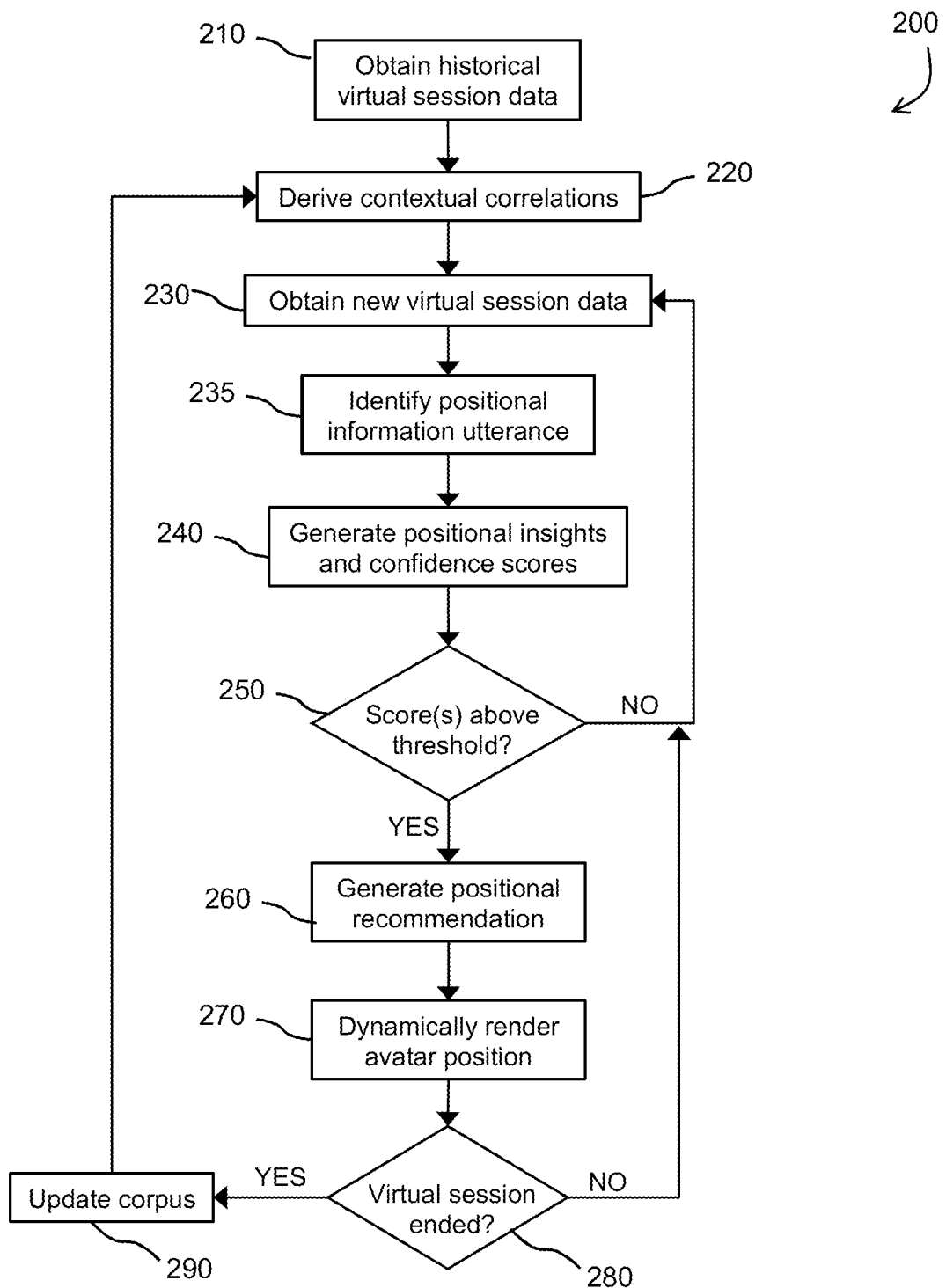
FIG. 2 is a flowchart illustrating an example process of generating positional directives in a virtual space, according to some embodiments of the present disclosure.

FIG. 2 is a flowchart illustrating an example process of generating positional directives in a virtual space, according to some embodiments of the present disclosure. Process 200 can be performed by components of environment 100 and, for illustrative purposes, is discussed with reference to FIG. 1. A corpus 110 of historical data from instructional sessions in a virtual space is obtained. This is illustrated at operation 210. For example, historical corpus 110 can be a central corpus for participating virtual instructional sessions that have been completed. Participating virtual sessions can be instruction sessions that are registered to be recorded with consent from users/attendees. The virtual sessions can be network-enabled with sufficient security privileges to report collected information to a central corpus and to receive positional rendering instructions from, e.g., contextual positioning module 109. Examples of historical virtual session data stored in corpus 110 are discussed in greater detail with respect to FIG. 1.

Correlations between positional requests and contextual information can be derived from the virtual session data in corpus 110. This is illustrated at operation 220. In some embodiments, correlation component 125 uses classification techniques to cluster similar sessions and common groupings of positional requests. One or more classification techniques such as k-means clustering, hierarchical clustering, Density-Based Spatial Clustering of Applications with Noise (DBSCAN) clustering, Latent Dirichlet Allocation (LDA), etc. may be used. For example, k-means clustering may identify similar positional requests from more than one user (e.g., two students requesting positions "in front of the whiteboard"). In further embodiments, LDA can be used to extract common topics from clustered instructional sessions. For example, common topics may include "lecture", "lab", "group work", etc.

Additionally, correlation component 125 can use hierarchical clustering to identify users that tend to make similar positional requests throughout the instructional session(s). For example, there may be students who always request positions in "the back row" of a virtual space such as a classroom. Further, DBSCAN clustering may be used to identify outlier requests, which can be positional requests that do not fit in common groupings. For example, in an instructional session that includes a virtual rendering of a server rack, a student may ask to be positioned in front of a hardware component of the server rack that has not been addressed yet or is infrequently viewed/discussed.

Correlation component 125 can also use contextual correlation techniques to determine relationships ("contextual correlations") between positional requests and the contextual groupings. These techniques can include co-occurrence analysis, which can identify how often certain words, phrases, etc. are used together. For example, the positional phrase "in front of" may often co-occur with the word "whiteboard". In some embodiments, point-wise mutual information (PMI) can be used to identify which words/phrases tend to occur together. In further embodiments, term frequency analysis, such as inverse document frequency (TF-IDF), can be used to identify words that are unique to a particular document or instructional element.

Further, correlation component 125 can use rule-based methods to derive contextual correlations between user positional requests and corresponding instructor actions, instructions, or other contextual information/groupings (e.g., timestamps, user avatar position in relation to other user avatars or virtual objects, etc.). These methods can include heuristic rules, example-based rules, statistical rules, etc. For example, heuristic rules may be used to map user position requests to contextual information defined based on common scenarios in virtual instructional sessions. Example-based rules may be used to map user position requests to contextual information defined based on previous virtual instructional sessions. Statistical rules may be used to map frequency and duration/timing of user position requests to contextual information in corpus 110 as well.

Correlation component 125 can derive these correlations and train models ("correlation models") such as classification models, NLU models, scoring models, etc. for predicting positional directives (e.g., positional requests/instructions) based on contextual information.

New virtual session data 130 is then obtained from a virtual session occurring in real time. This is illustrated at operation 230. This real-time virtual session can be a participating VR instructional session that is registered to be recorded with consent from users/attendees. The new virtual session may occur in a virtual space substantially the same as, or similar to, one or more of the completed historical virtual sessions. However, there may be a variety of different virtual spaces in which instructional sessions are recorded. The new virtual session can be network-enabled with sufficient security privileges to report collected information to central corpus 110 and to receive positional rendering instructions from contextual positioning module 109.

The new virtual session data 130 can include timestamps, elapsed times (e.g., of the session and/or intervals therein), reported user (e.g., student(s) and instructor(s)) positional information at each elapsed time interval, user avatar identifiers (IDs), rendered object IDs, textual information rendered in the virtual space, user microphone audio data (e.g., recorded by audio processor 123), and any other ancillary information for understanding the virtual session. Utterance information from the new virtual session can be extracted from speech data recorded in real time by audio processor 123. This extraction can be carried out by NLU component 115 in real time using substantially the same or similar techniques discussed with respect to operations 210.

Utterances containing positional information can be identified in real-time by NLU component 115. This is illustrated at operation 235. For example, NLU component 115 can interpret the intent of an utterance such as "Mary, come to the whiteboard," to be a positional instruction for an avatar corresponding to user Mary. For example, NLU component 115 can interpret the intent of an utterance such as "Mary, come to the whiteboard" to include positional instructions for an avatar corresponding to user Mary. Positional utterances can also be identified based on contextual correlations such as correlations between locations and activities. For example, an utterance such as "the exam will begin shortly" may be correlated with a virtual classroom location. In some embodiments, there can be multiple utterances with substantially the same intent. For example, three users may provide utterances indicating that they cannot see a demonstration during a given time period.

Positional insights and corresponding confidence scores can be generated based on the new virtual session data. This is illustrated at operation 240. Insight generator 140 can use techniques such as those discussed with respect to correlation component 125 in order to derive contextual correlations for the identified positional utterances likely to include positional instructions. Additional positional insights may be generated based on further contextual correlations. For example, positional insights may indicate a user's likelihood of obstructing the view of another user. Another positional insight may indicate the ideal duration of positional adherence (e.g., an estimated amount of time remaining in a demonstration).

Positional insights can be generated based on the contextual correlations using the correlation models trained on the virtual session data in corpus 110. The positional insights can be scored forecasts for positional adherence, such as location and orientation of the avatar in the virtual space, distance between the user avatar and another avatar or an object rendered in the virtual space, timing (e.g., in seconds) of a positional request, etc. Each positional insight can be accompanied by a confidence score indicating a likelihood of resulting in a successful instructional experience for the user, if implemented at operation 280 (see below). Generating the positional insights can include using various techniques to score correlations between positional utterances (e.g., requests, instructions, etc.) and contextual information. These methods can include heuristic rules, example-based rules, statistical rules, etc. This is discussed in greater detail above with respect to operation 220.

In the above example in which three users cannot see the demonstration, positional insights may indicate a first location closer to the instructor/demonstration predicted to offer a better view with a confidence score of 85% for all three users. There may be additional positional insights indicating, for example, that at least one of the three users would also have a better view from another orientation. In the above example in which user Mary is asked to come to the whiteboard, a positional insight may indicate with, e.g., 95% confidence that Mary's position should be rendered at the virtual whiteboard in response to the utterance. Additional positional insights may be generated based on further contextual correlations. For example, positional insights may indicate Mary's likelihood of obstructing the view of another student for given positions at the whiteboard. Another positional insight may indicate whether Mary should be facing the whiteboard (e.g., if she is writing) or facing away from the whiteboard (e.g., if she is addressing the class).

It can be determined whether positional insights have confidence scores above a given threshold score. This is illustrated at operation 250. If there are no positional insights with scores above the threshold score, process 200 may return to operation 230. However, in some embodiments, positional insights and confidence scores can be added to corpus 110 even if the confidence scores are below the threshold. This is not illustrated in FIG. 2.

If there are positional insights having confidence scores above the threshold at operation 250, recommendation component 145 can generate positional recommendations based on these insights. This is illustrated at operation 260. Referring to the example above, positional recommendations can be generated for Mary's avatar by selecting positional insights having confidence scores greater than 90%. For example, these positional insights can include a location (e.g., x,y,z-coordinates) at the whiteboard with a confidence score of 95% and an orientation relative to the whiteboard with a confidence score of 80%. The positional recommendations can therefore include the location coordinates, but not the orientation direction.

The user avatar position can be dynamically rendered based on at least one recommendation generated at operation 260. This is illustrated at operation 270. Positioning component 150 can compare the current user (e.g., student) avatar position with an ideal location based on at least one of the positional recommendations. For example, the ideal position may include a location (e.g., cartesian coordinates) and orientation relative to another component of the virtual space. If the user avatar is not in the ideal position, positioning component 150 can use one or more positional rendering techniques to make appropriate modifications to the position rendering, such as teleporting, smoothing, interpolating, etc. These techniques are discussed in greater detail with respect to FIG. 1.

In some embodiments, each recommendation is implemented at operation 270. However, there can be additional criteria for rendering based on positional recommendations. For example, in some embodiments, the user is provided one or more position rendering options, which can then be accepted or rejected. In another example, the user may request a different position after the automatic rendering has taken place, thereby rejecting the position recommendation. User feedback such as acceptance or rejection of positional recommendations can be recorded in corpus 110 and used for correlation model training (see operation 290).

It can then be determined whether the virtual session is complete. This is illustrated at operation 280. If the virtual session is not complete, process 200 can proceed again to operation 230 and continue monitoring the virtual session. When the virtual session is complete, the session data collected at operation 230, as well as positional insights and confidence scores generated at operation 240 can be added to corpus 110. This is illustrated at operation 290.

Feedback data can also be added to corpus 110 at operation 290. While not shown in FIG. 2, user feedback can be continually collected throughout process 200 and used to validate positional recommendations and refine models (e.g., NLU, classification, and scoring models) used to generate correlations at operation 220. This feedback can include log files. For example, interactions between the user and the virtual environment can be logged and used to generate positional insights/recommendations based thereon. Implicit and explicit feedback can also be collected from the user. For example, explicit feedback can be collected using mechanisms such as providing a survey at the end and/or or during the virtual session. Implicit feedback can also be determined based on user responses gathered using techniques such as eye tracking, heartrate monitoring, NLU, etc. User feedback can also be collected at operation 270 (see above) if the user accepts or rejects a dynamic position rendering. In some embodiments, the feedback data is obtained from a student user. Feedback data can also be obtained from other users, such as instructors.

Process 200 can then return to operation 220 and derive/update correlations based on the updated corpus 110. When a next virtual session begins, process 200 can proceed to operation 230.

Figure 3:
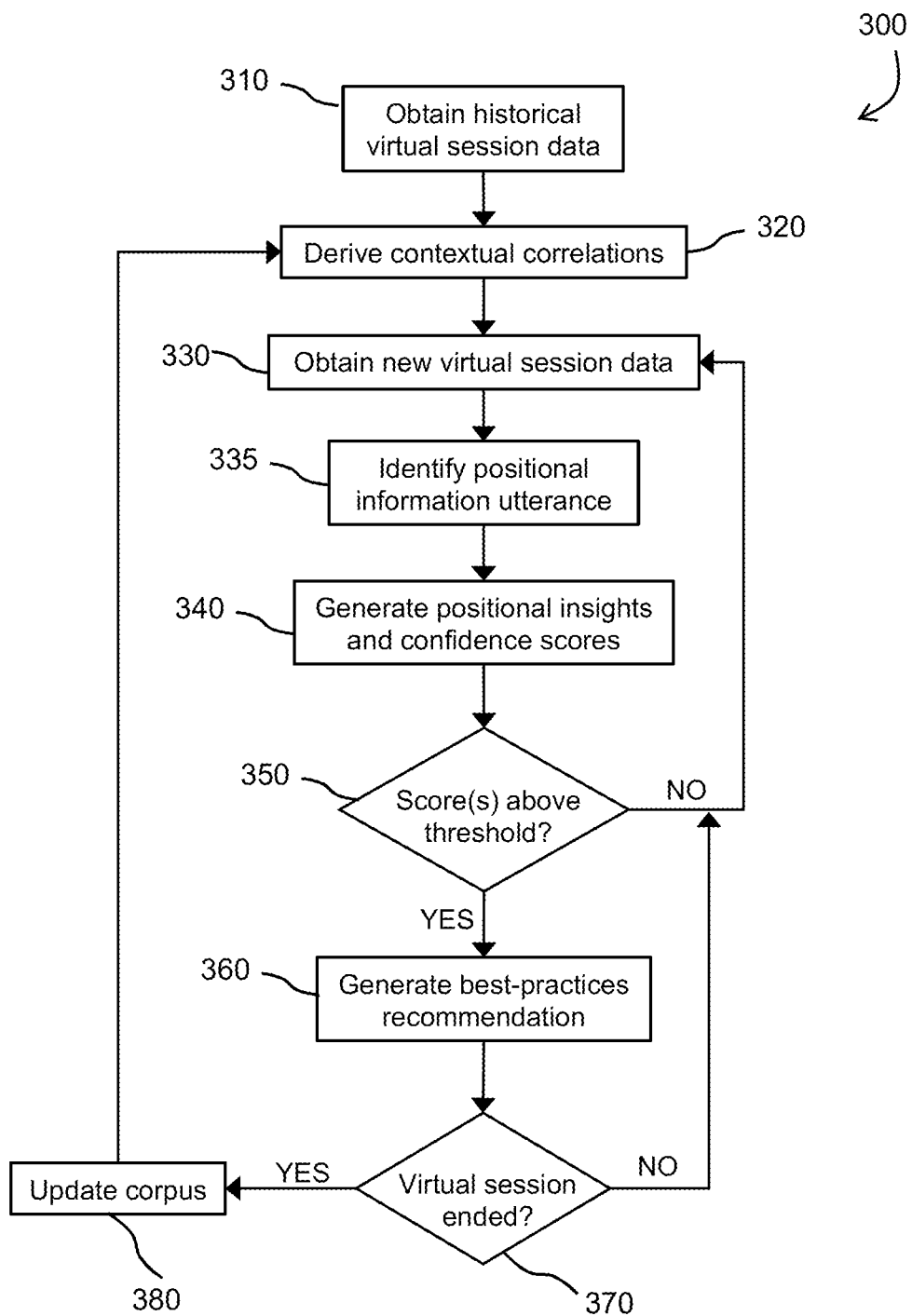
FIG. 3 is a flowchart illustrating a process of generating positional insights for a virtual session, according to some embodiments of the present disclosure.

FIG. 3 is a flowchart illustrating a process of generating positional insights for a virtual session, according to some embodiments of the present disclosure. Process 300 can be performed by components of environment 100 and, for illustrative purposes, is discussed with reference to FIG. 1. A corpus 110 of historical data from instructional sessions in a virtual space is obtained. This is illustrated at operation 310. Examples of historical virtual session data stored in corpus 110 are discussed in greater detail with respect to FIGS. 1 and 2.

Correlations between positional requests and contextual information can be derived from the virtual session data in corpus 110. This is illustrated at operation 320. Deriving these contextual correlations can be done using substantially the same techniques as at operation 220 of process 200 (FIG. 2). New virtual session data 130 is then obtained from a virtual session occurring in real time. This is illustrated at operation 330. Operation 330 can be carried out using substantially the same techniques as at operation 230 of process 200. Positional utterances can be identified in real-time by NLU component 115. This is illustrated at operation 335. Operation 335 can be carried out using substantially the same techniques as operation 235 of process 200.

Positional insights and corresponding confidence scores can be generated based on the new virtual session data. This is illustrated at operation 340. Generating and scoring positional insights can be done using substantially the same techniques as at operation 240 of process 200. It can be determined whether positional insights have confidence scores above a given threshold score. This is illustrated at operation 350. If there are no positional insights with scores above the threshold score, process 300 may return to operation 330. However, in some embodiments, positional insights and confidence scores can be added to corpus 110 even if the confidence scores are below the threshold. This is not illustrated in FIG. 3.

If there are positional insights having confidence scores above the threshold at operation 350, recommendation component 145 can generate best-practices recommendations based on these insights. This is illustrated at operation 360. A report detailing these best-practices recommendations can be generated and output to a user, such as the instructor of the new virtual session, instructor(s) of future virtual sessions, instructional session designers and administrators, students, etc. For example, best-practices recommendations may be generated by selecting positional insights having confidence scores greater than 70%. In some embodiments, the recommendations are weighted based on confidence scores or other factors. Continuing the previous examples (see above at operation 240 of process 200), the insights providing Mary's location (95% confidence), Mary's orientation (80% confidence), and the other three users' locations (85% confidence) can each be selected as best-practices recommendations. Based on these recommendations, the output report may recommend changing the position of the demonstration because multiple students were unable to see and/or directing students to recommended positions before the demonstration begins.

It can then be determined whether the virtual session is complete. This is illustrated at operation 370. If the virtual session is not complete, process 300 can proceed again to operation 330 and continue monitoring the virtual session. When the virtual session is complete, the session data collected at operation 330, as well as positional insights and confidence scores generated at operation 340 can be added to corpus 110. This is illustrated at operation 380.

Feedback data can also be added to corpus 110 at operation 380. While not shown in FIG. 3, user feedback can be continually collected throughout process 300 and used to validate positional recommendations and refine models (e.g., NLU, classification, and scoring models) used to generate correlations at operation 320. This feedback can include feedback such as that discussed with respect to operation 290 of process 200. User feedback can also be collected in response to the best-practices recommendations generated at operation 360.

Process 300 can then return to operation 320 and derive/update correlations based on the updated corpus 110. When a next virtual session begins, process 300 can proceed to operation 230.

In some embodiments, processes 200 and 300 can be carried out simultaneously or combined. For example, positional insights can be generated at operation 240 or 340. Positional and/or best-practices recommendations can then be generated for insights with confidence scores above the threshold score(s) at operation 250, 350, or both. In some embodiments, both threshold scores are used, and operation 250 has a higher threshold score than operation 350. In these instances, positional insights may only lead to dynamic position rendering (operation 270) when the corresponding confidence scores are greater than the threshold at 250. However, positional insights with confidence scores above the lower threshold at 350 may be used to generate best-practices recommendations (operation 360).

Figure 4:
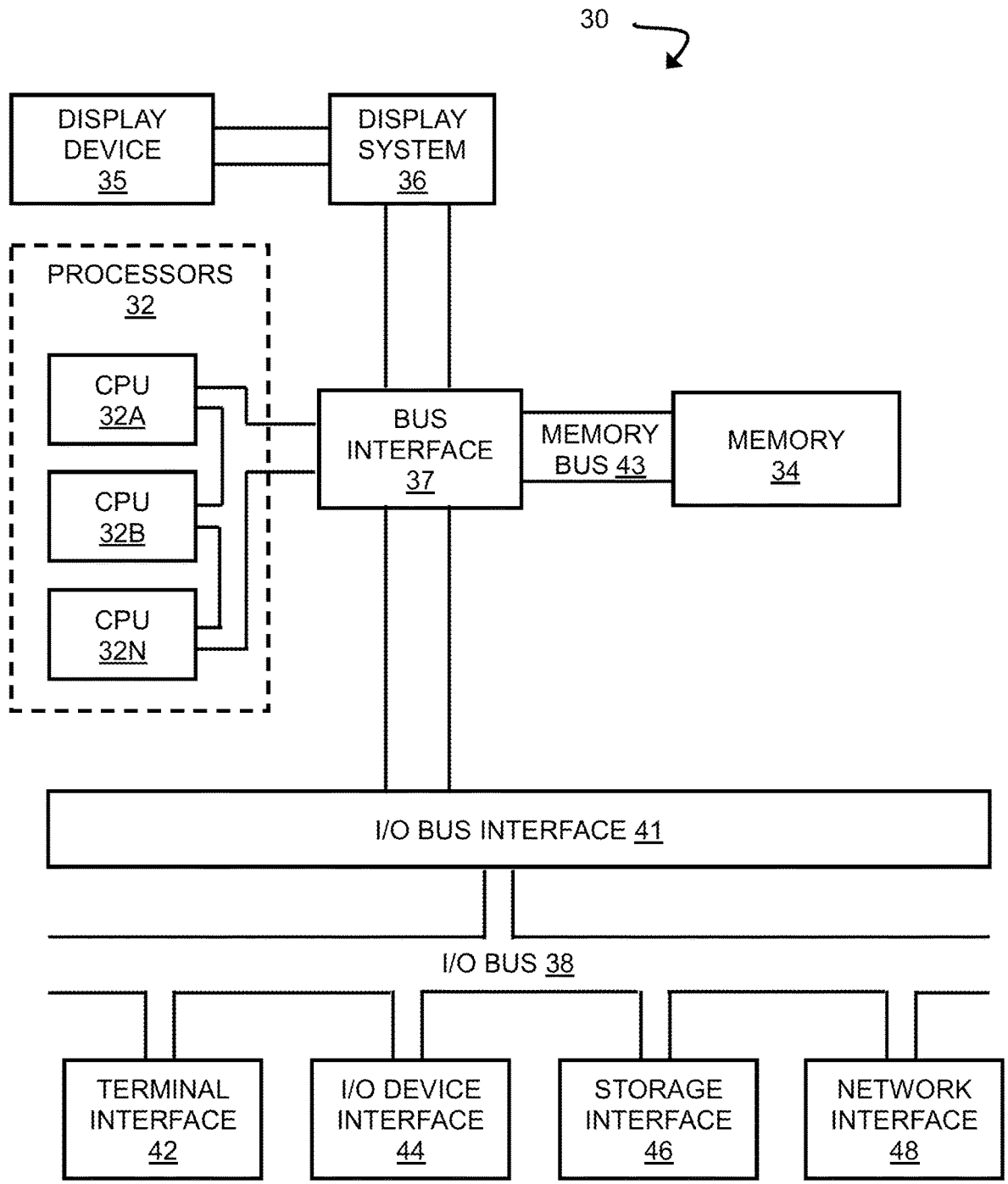
FIG. 4 is a block diagram illustrating a computer system, according to some embodiments of the present disclosure.

FIG. 4 is a block diagram illustrating an exemplary computer system 30 that can be used in implementing one or more of the methods, tools, components, and any related functions described herein (e.g., using one or more processor circuits or computer processors of the computer). In some embodiments, the major components of the computer system 30 comprise one or more processors 32, a memory subsystem 34, a terminal interface 42, a storage interface 46, an input/output device interface 44, and a network interface 48, all of which can be communicatively coupled, directly or indirectly, for inter-component communication via a memory bus 33, an input/output bus 38, bus interface unit 37, and an input/output bus interface unit 41.

The computer system 30 contains one or more general-purpose programmable central processing units (CPUs) 32A, 32B, and 32N, herein collectively referred to as CPU 32. In some embodiments, the computer system 30 contains multiple processors typical of a relatively large system; however, in other embodiments the computer system 30 can alternatively be a single CPU system. Each CPU 32 may execute instructions stored in the memory subsystem 34 and can include one or more levels of on-board cache.

The memory 34 can include a random-access semiconductor memory, storage device, or storage medium (either volatile or non-volatile) for storing or encoding data and programs. In some embodiments, the memory 34 represents the entire virtual memory of the computer system 30 and may also include the virtual memory of other computer systems coupled to the computer system 30 or connected via a network. The memory 34 is conceptually a single monolithic entity, but in other embodiments the memory 34 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures.

Components of environment 100 (FIG. 1) can be included within the memory 34 in the computer system 30. However, in other embodiments, some or all of these components may be on different computer systems and may be accessed remotely, e.g., via a network. The computer system 30 may use virtual addressing mechanisms that allow the programs of the computer system 30 to behave as if they only have access to a large, single storage entity instead of access to multiple, smaller storage entities. Thus, components of the memory 34 are not necessarily all completely contained in the same storage device at the same time. Further, although components of environment 100 are illustrated as being separate entities, in other embodiments some of these components, portions of some of these components, or all of these components may be packaged together.

In an embodiment, components of environment 100 include instructions that execute on the processor 32 or instructions that are interpreted by instructions that execute on the processor 32 to carry out the functions as further described in this disclosure. In another embodiment, components of environment 100 are implemented in hardware via semiconductor devices, chips, logical gates, circuits, circuit cards, and/or other physical hardware devices in lieu of, or in addition to, a processor-based system. In another embodiment, components of environment 100 include data in addition to instructions.

Although the memory bus 33 is shown in FIG. 4 as a single bus structure providing a direct communication path among the CPUs 32, the memory subsystem 34, the display system 36, the bus interface 37, and the input/output bus interface 41, the memory bus 33 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 41 and the input/output bus 38 are shown as single respective units, the computer system 30 may, in some embodiments, contain multiple input/output bus interface units 41, multiple input/output buses 38, or both. Further, while multiple input/output interface units are shown, which separate the input/output bus 38 from various communications paths running to the various input/output devices, in other embodiments some or all of the input/output devices may be connected directly to one or more system input/output buses.

The computer system 30 may include a bus interface unit 37 to handle communications among the processor 32, the memory 34, a display system 36, and the input/output bus interface unit 41. The input/output bus interface unit 41 may be coupled with the input/output bus 38 for transferring data to and from the various input/output units. The input/output bus interface unit 41 communicates with multiple input/output interface units 42, 44, 46, and 48, which are also known as input/output processors (IOPs) or input/output adapters (IOAs), through the input/output bus 38. The display system 36 may include a display controller. The display controller may provide visual, audio, or both types of data to a display device 35. The display system 36 may be coupled with a display device 35, such as a standalone display screen, computer monitor, television, or a tablet or handheld device display. In alternate embodiments, one or more of the functions provided by the display system 36 may be on board a processor 32 integrated circuit. In addition, one or more of the functions provided by the bus interface unit 37 may be on board a processor 32 integrated circuit.

In some embodiments, the computer system 30 is a multi-user mainframe computer system, a single-user system, or a server computer or similar device that has little or no direct user interface but receives requests from other computer systems (clients). Further, in some embodiments, the computer system 30 is implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 30. In some embodiments, however, individual components may have greater or lesser complexity than as represented in FIG. 4, Components other than or in addition to those shown in FIG. 4 may be present, and the number, type, and configuration of such components may vary.

In some embodiments, the data storage and retrieval processes described herein could be implemented in a cloud computing environment, which is described below with respect to FIGS. 5 and 6. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher-level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
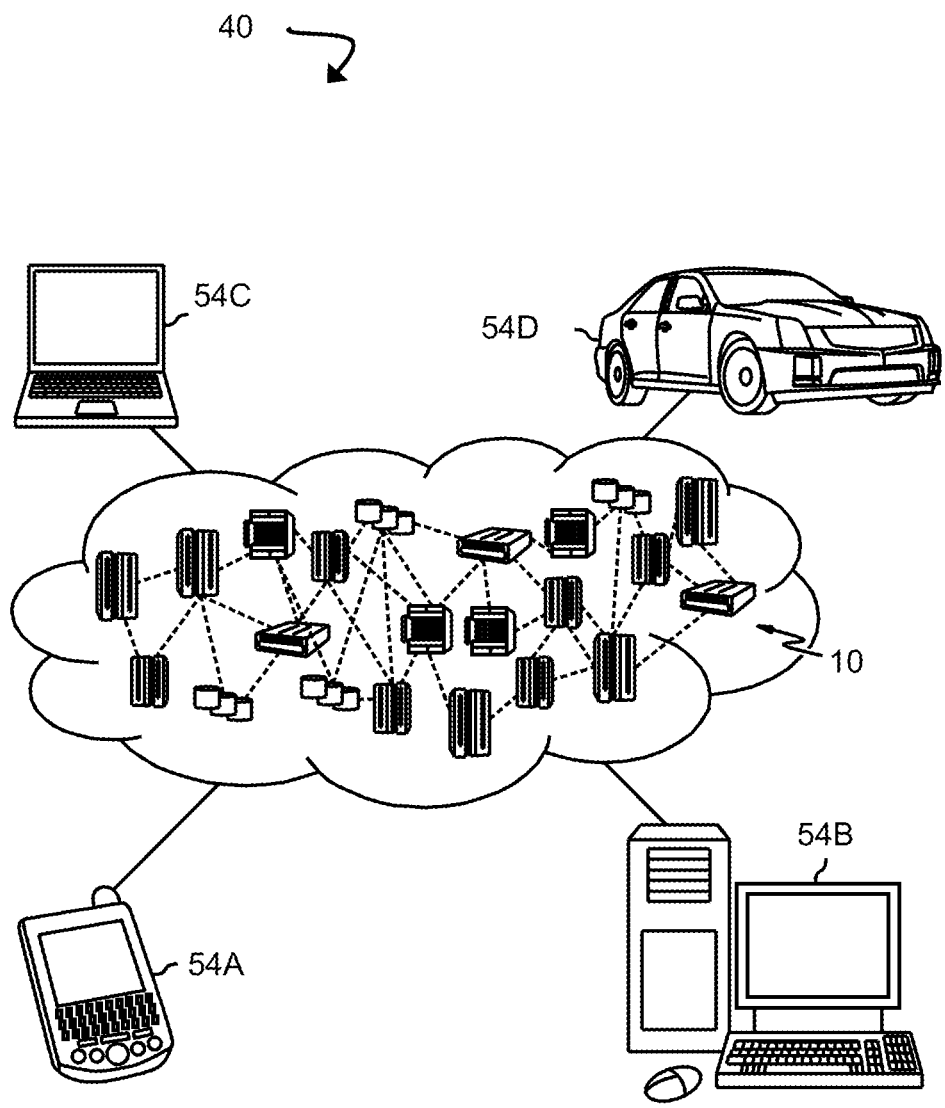
FIG. 5 is a block diagram illustrating a cloud computing environment, according to some embodiments of the present disclosure.

FIG. 5 is a block diagram illustrating a cloud computing environment 40, according to some embodiments of the present disclosure. As shown, cloud computing environment 40 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54D may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 40 to offer infrastructure, platforms and/or software as services for which a cloud consumer does not need to maintain resources on a local computing device. It is understood that the types of computing devices 54A-54D shown in FIG. 5 are intended to be illustrative only and that computing nodes 10 and cloud computing environment 40 can communicate with any type of computerized device over any type of network and/or network addressable connection (e.g., using a web browser).

Figure 6:
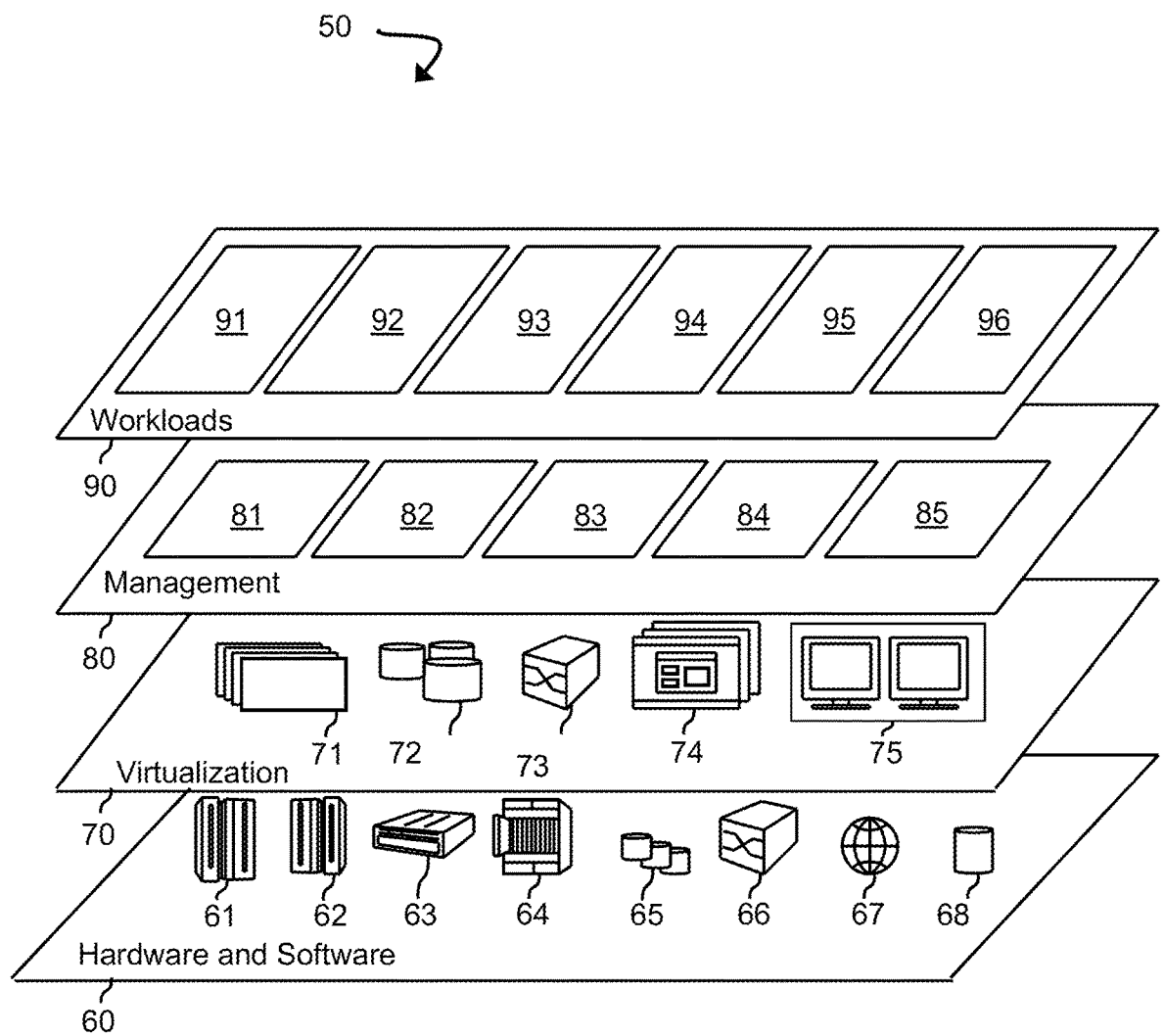
FIG. 6 is a block diagram illustrating a set of functional abstraction model layers provided by the cloud computing environment, according to some embodiments of the present disclosure.

FIG. 6 is a block diagram illustrating a set of functional abstraction model layers 50 provided by the cloud computing environment 40, according to some embodiments of the present disclosure. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions that can be provided from this layer include: mapping and navigation 91; software development and lifecycle management 92; virtual classroom education delivery 93; data analytics processing 94; transaction processing 95; and positioning in virtual space 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof.

In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, and item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; ten of item C; four of item B and seven of item C; or other suitable combinations.

What is claimed is:

1. A method, comprising:
    obtaining virtual session data in real time from a virtual session in a virtual space, wherein the virtual session data comprises natural language utterances of users participating in the virtual session;
    identifying a positional utterance in the natural language utterances;
    generating a positional insight for the positional utterance, wherein the positional insight indicates an ideal location within the virtual space for an avatar representing a user from the users;
    determining that the positional insight has a confidence score above a threshold score;
    in response to the determining, selecting the positional insight;
    in response to the selecting, generating a best-practices recommendation based on the positional insight;
    in response to the best-practices recommendation, comparing a location of the avatar with the ideal location; and
    based on the comparing, automatically modifying a positional rendering of the avatar.

2. The method of claim 1, further comprising generating a report providing a best-practices recommendation for rendering the virtual space during an instructional session.

3. The method of claim 1, wherein the positional insight is generated based on a contextual correlation between the positional utterance and contextual information about the virtual session.

4. The method of claim 1, wherein the positional utterance is identified in real time by, using natural language understanding, detecting an utterance related to a location within the virtual space.

5. The method of claim 1, further comprising adding the virtual session data to a corpus of historical virtual session data.

6. The method of claim 1 further comprising receiving user feedback in response to the best-practices recommendation.

7. The method of claim 1, further comprising generating a best-practices recommendation for positioning user avatars in a virtual instruction session.

8. The method of claim 1, further comprising generating a best-practices recommendation for positioning virtually rendered objects in a virtual instruction session.

9. The method of claim 1, wherein the positional insight is generated using at least one correlation model, and wherein the method further comprises training the at least one correlation model, the training comprising:
    obtaining a corpus of historical virtual session data comprising positional requests and contextual information extracted from speech data during at least one virtual session in the virtual space; and
    deriving correlations between the contextual information and the positional requests.

10. The method of claim 9, wherein the contextual information is defined based on common scenarios in virtual instructional sessions.

11. The method of claim 1, wherein the identifying comprises:
    detecting an utterance related to an activity; and
    determining that the activity is correlated with a location within the virtual space.

12. A system, comprising:
    a memory; and
    a processor communicatively coupled to the memory, wherein the processor is configured to perform a method comprising:
        obtaining virtual session data in real time from a virtual session in a virtual space, wherein the virtual session data comprises natural language utterances of users participating in the virtual session;
        identifying a positional utterance in the natural language utterances;
        generating a positional insight for the positional utterance, wherein the positional insight indicates an ideal location within the virtual space for an avatar representing a user from the users;
        determining that the positional insight has a confidence score above a threshold score;

in response to the determining, selecting the positional insight;

in response to the selecting, generating at least one best-practices recommendation based on the positional insight;

in response to the at least one best-practices recommendation, comparing a location of the avatar with the ideal location; and based on the comparing, automatically modifying a positional rendering of the avatar.

13. The system of claim 12, further comprising, in response to the best-practices recommendation, generating a report providing a recommendation for rendering the virtual space during an instructional session.

14. The system of claim 12, wherein the positional insight is generated based on a contextual correlation between the positional utterance and contextual information about the virtual space.

15. The system of claim 12, wherein the positional utterance is identified in real time by, using natural language understanding, detecting an utterance related to a location within the virtual space.

16. The system of claim 12, further comprising adding the virtual session data to a corpus of historical virtual session data.

17. The system of claim 12, further comprising receiving user feedback in response to the best-practices recommendation.

18. The system of claim 12, further comprising generating a best-practices recommendation for positioning user avatars in a virtual instruction session.

19. The system of claim 12, further comprising generating a best-practices recommendation for positioning virtually rendered objects in a virtual instruction session.

20. A computer program product, the computer program product comprising a computer readable storage medium having program instructions embodied therewith, the program instructions executable by a processor to cause a device to perform a method, the method comprising:

obtaining virtual session data in real time from a virtual session in a virtual space, wherein the virtual session data comprises natural language utterances of users participating in the virtual session;

identifying a positional utterance in the natural language utterances;

generating a positional insight for the positional utterance, wherein the positional insight indicates an ideal location within the virtual space for an avatar representing a user from the users based on a correlation between the positional utterance and contextual information about the virtual session;

determining that the positional insight has a confidence score above a threshold score;

in response to the determining, selecting the positional insight;

in response to the selecting, generating a best-practices recommendation based on the positional insight;

in response to the best-practices recommendation, comparing a location of the avatar with the ideal location; and based on the comparing, automatically modifying a positional rendering of the avatar.

21. The computer program product of claim 20, further comprising generating a report providing a best-practices recommendation for rendering the virtual space during an instructional session.

22. The computer program product of claim 20, further comprising generating a best-practices recommendation for positioning user avatars in a virtual instruction session.

23. The computer program product of claim 20, further comprising generating a best-practices recommendation for positioning virtually rendered objects in a virtual instruction session.

24. A method, comprising:

obtaining virtual session data from a virtual session in a virtual space, wherein the virtual session data comprises natural language utterances of users participating in the virtual session;

identifying positional utterances in the natural language utterances;

generating positional insights for each of the positional utterances, wherein the positional insights comprise an insight indicating an ideal location within the virtual space for an avatar representing a user from the users based on a correlation between the positional utterance and contextual information about the virtual session;

selecting each of the positional insights having confidence scores above a threshold score;

generating best-practices recommendations based on the selected positional insights;

in response to at least one of the best-practices recommendations, comparing a location of the avatar with the ideal location; and based on the comparing, automatically modifying a positional rendering of the avatar.

25. A system, comprising:

a memory; and a processor communicatively coupled to the memory, wherein the processor is configured to perform a method comprising:

obtaining virtual session data from a virtual session in a virtual space, wherein the virtual session data comprises natural language utterances of users participating in the virtual session;

identifying positional utterances in the natural language utterances;

generating positional insights for each of the positional utterances, wherein the positional insights comprise an insight indicating an ideal location within the virtual space for an avatar representing a user from the users based on a correlation between the positional utterance and contextual information about the virtual session;

selecting each of the positional insights having confidence scores above a threshold score;

generating best-practices recommendations based on the selected positional insights;

in response to at least one of the best-practices recommendations, comparing a location of the avatar with the ideal location; and based on the comparing, automatically modifying a positional rendering of the avatar.

* * * * *